April 17, 1945.　　　T. L. WEYBREW　　　2,374,060

LOCOMOTIVE CONTROL SYSTEM

Filed Jan. 21, 1944

WITNESSES:
E. A. McCloskey.
J. S. Chilcott

INVENTOR
Thelbert L. Weybrew.
BY
C. M. Crawford
ATTORNEY

Patented Apr. 17, 1945

2,374,060

UNITED STATES PATENT OFFICE 2,374,060

LOCOMOTIVE CONTROL SYSTEM

Thelbert L. Weybrew, Edgewood, Pa., assignor to Westinghouse Electric & Manufacturing Company, East Pittsburgh, Pa., a corporation of Pennsylvania Application January 21, 1944, Serial No. 519,176

10 Claims. (Cl. 290—16)

My invention relates, generally, to locomotive control systems and, more particularly, to systems for controlling the operation of Diesel-electric locomotives.

Locomotive Diesel engines larger than 300 horsepower are normally started by the main generator operating as a series motor from a storage battery. Prior systems require a generator having a separate heavy field winding of a few turns which is utilized only during starting of the engine. The generator always has another field winding which is normally utilized during power operation. This field winding is energized by an exciter which may be of the differential field type and driven by the engine.

An object of my invention, generally stated, is to reduce the cost and the size of Diesel-electric locomotive generators which are utilized for both starting and power operation.

A more specific object of my invention is to utilize the same generator field winding for both starting and power operation, thereby eliminating the separate heavy field winding previously utilized for starting.

Another object of my invention is to vary the speed at which a generator cranks an engine during starting.

A further object of my invention is to protect the storage battery which supplies the cranking current against overvoltage after the engine has started.

Other objects of my invention will be explained fully hereinafter or will be apparent to those skilled in the art.

In accordance with one embodiment of my invention, the main field winding of the main generator of a Diesel-electric locomotive is made suitable for excitation from a battery during engine starting and the exciter is designed to have the proper voltage and current characteristic to excite the generator field winding during power operation.

For a fuller understanding of the nature and objects of my invention, reference may be had to the following detailed description, taken in conjunction with the accompanying drawing, in which.

Figures 1, 2:
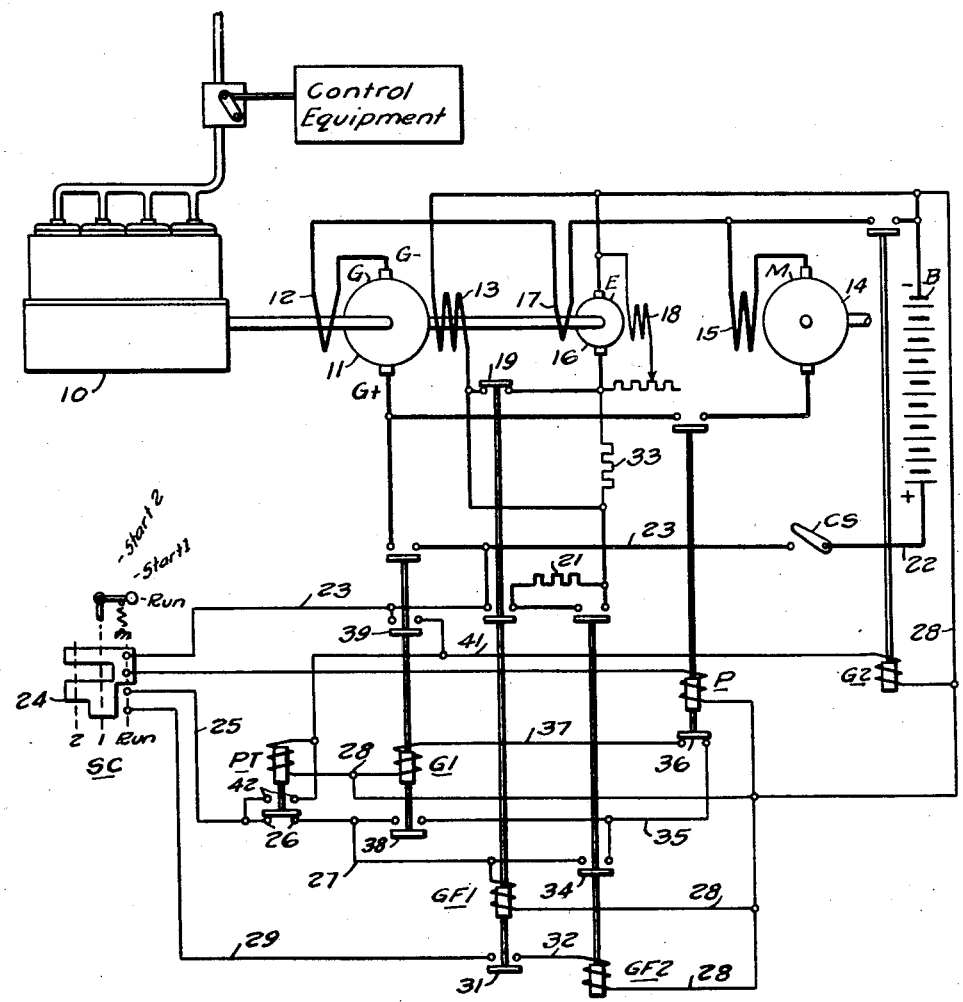
Figure 1 is a diagrammatic view of a control system embodying my invention.
Fig. 2 is a chart showing the sequence of operation of a part of the apparatus illustrated in Fig. 1.

Referring to the drawing, the system shown therein comprises an internal combustion engine 10 which drives a generator G and an exciter E. The generator G normally supplies current for operating a traction motor M and the generator is provided with an armature winding 11, a commutating field winding 12, and a separately excited field winding 13. The motor M is of a type suitable for propelling a vehicle (not shown) and is provided with an armature winding 14 and a series field winding 15. The exciter E is provided with an armature winding 16, a differential field winding 17, and a shunt field winding 18.

During power operation, the armature winding 11 of the generator G is connected in series-circuit relation with the motor M by a switch P. As explained hereinbefore, the generator G is utilized to crank the engine 10 during starting, and the armature winding 11 of the generator G is connected across a battery B through a control switch CS and switches G1 and G2. The field winding 13 of the generator G is also connected across the battery B through the control switch CS and switches GF1 and GF2. During the starting operation, the main circuit between the exciter E, which normally supplies the excitation current for the field winding 13 of the generator G, and the field winding is interrupted by the opening of contact members 19 of the switch GF1. The operation of the foregoing switches is controlled by a manually operable controller SC.

In order to protect the battery B from the excessive voltage generated by the generator G, after the engine has been started, a relay PT is provided for causing the opening of the switches GF1, GF2 and G1 to disconnect the generator from the battery when the voltage impressed on the battery is slightly above the open-circuit battery voltage. A holding circuit is provided for the relay PT which holds the relay closed until the operator releases the handle of the starting controller SC which is returned to the "run" position by a spring. In this manner the switches which connect the generator to the battery are prevented from reclosing if the operator fails to release the controller handle promptly after the engine starts. The battery B may be recharged by an auxiliary generator (not shown) or other suitable means.

As shown, the starting controller SC is provided with two starting positions. Normally, the engine 10 will be driven fast enough by the generator G with the field winding 13 connected directly across the battery B. However, with this connection, the generator field strength increases in relation to the armature current as the armature current, drawn from the battery, is reduced by the building up of the generated countervoltage. Therefore, a balancing speed is reached if cranking is continued and it is sometimes necessary to rotate the engine at a higher speed to get it to fire. A second position "start 2" is provided on the controller SC for deenergizing the actuating coil of the switch GF2, thereby causing this switch to open and insert a resistor 21 in the circuit for the field winding 13 of the generator G. In this manner the field strength of the generator is weakened, causing the generator, which is functioning as a shunt motor, to rotate at a higher speed.

In order that the functioning of the foregoing apparatus may be more clearly understood, the operation of the system will now be described in more detail. If it is desired to crank the engine 10, the switch CS is closed and the controller SC is actuated to the "start 1" position. When the controller SC is in the "start 1" position, the actuating coil of the switch P is deenergized, thereby opening this switch to disconnect the generator G from the traction motor M.

At this time, the switches GF1 and GF2 are closed in sequential relation to connect the generator field winding 13 across the battery B. The energizing circuit for the switch GF1 may be traced from the positive terminal of the battery B through conductor 22, the switch CS, conductor 23, a segment 24 of the controller SC, a conductor 25, contact members 26 of the relay PT, conductor 27, the actuating coil of the switch GF1 and conductor 28 to the negative terminal of the battery B. Following the closing of the switch GF1, the switch GF2 is energized through a circuit which extends from the controller SC through conductor 29, an interlock 31 on the switch GF1, conductor 32 and the actuating coil of the switch GF2 to the negative conductor 28.

As explained hereinbefore, the operation of the switch GF1 opens its contact members 19 to interrupt the main circuit between the exciter 18 and the field winding 13 of the generator G. A resistor 33 is provided in the circuit for the armature 16 of the exciter E to prevent an excessive current flowing from the battery through the exciter armature during the starting operation.

Following the closing of the switch GF2, the switches G1 and G2 are closed in sequential relation to connect the armature winding 11 of the generator G across the battery B. The energizing circuit for the switch G1 may be traced from the previously energized conductor 27 through an interlock 34 on the switch GF2, conductor 35, an interlock 36 on the switch P, conductor 37 and the actuating coil of the switch G1 to the negative conductor 28. A holding circuit for the switch G1 is established by the closing of an interlock 38 on the switch. The energizing circuit for the switch G2 extends from the conductor 23 through an interlock 39 on the switch G1, conductor 41 and the actuating coil of the switch G2 to the negative conductor 28.

As explained hereinbefore, the closing of the switches G1 and G2 connects the generator armature to the battery B. Since the field winding 13 has been previously connected across the battery B, the generator functions as a shunt motor to crank the engine 10. If it is necessary to rotate the engine at a higher speed, the controller SC is actuated to the "start 2" position, thereby deenergizing the coil of the switch GF2 and causing this switch to open to insert the resistor 21 in the circuit for the field winding 13 of the generator. In this manner, the generator is caused to rotate at a higher speed.

As previously explained, the speed of the engine will increase rapidly when it starts to fire, and the machine G then functions as a self-excited shunt generator and even at the idling speed of the engine would generate sufficient voltage to seriously injure the battery B. Therefore, the actuating coil of the protective relay PT is connected across the battery and the relay is adjusted to operate at a voltage slightly above the open circuit battery voltage. The energizing circuit for the relay PT may be traced from the conductor 23 through the interlock 39 on the switch G1, conductor 41 and the actuating coil of the relay PT to the negative conductor 28. When the generator voltage builds up to the relay closing voltage after the engine fires, the relay operates to open the circuits for the actuating coils of the switches GF1, GF2 and G1, thereby disconnecting the generator armature and field windings from the battery.

As explained hereinbefore, a holding circuit for the relay PT is established through its contact members 42 thereby holding the relay closed until the operator releases the handle of the controller SC. In this manner, the generator is prevented from being reconnected to the battery B in case the operator fails to release the handle of the controller SC promptly after the engine starts. When the handle of the controller SC is released, the controller is returned to the "run" position, thereby closing the switch P to connect the armature of the generator G to the traction motor M. As previously explained, the exciter E is connected to the field winding 13 of the generator when the switch GF1 is in the deenergized position. The apparatus may now be operated in the usual manner with the generator G supplying current for the motor 10 to drive the vehicle.

From the foregoing description, it is apparent that I have provided a system which materially decreases the size and cost of the generator for a Diesel-electric vehicle equipment by eliminating one of the field windings previously provided on the generator, and which was utilized only during the starting operation. The present system also provides for increasing the speed of the generator during the cranking operation if such an increase is necessary. The electrical equipment is automatically protected against an excessive voltage after the engine has fired and drives the generator.

Since numerous changes may be made in the above described construction and different embodiments of the invention may be made without departing from the spirit and scope thereof, it is intended that all matter contained in the foregoing description, or shown in the accompanying drawing, shall be interpreted as illustrative and not in a limiting sense.

I claim as my invention:

1. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator armature winding and field winding to the battery in parallel-circuit relation to crank the engine and for disconnecting the exciter from the generator field winding during the starting operation, a controller for initiating the operation of said switching means, and relay means responsive to the voltage impressed on the battery for causing the generator to be disconnected from the battery independently of said controller.

2. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator armature winding and field winding to the battery in parallel-circuit relation to crank the engine and for connecting the exciter to the generator field winding during power operation, a controller for initiating the operation of said switching means, and relay means responsive to the voltage impressed on the battery for causing the generator to be disconnected from the battery independently of said controller.

3. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator armature winding and field winding to the battery in parallel-circuit relation to crank the engine and for disconnecting the exciter from the generator field winding during the starting operation and connecting the exciter to the generator field winding during power operation, a controller for initiating the operation of said switching means, and relay means responsive to the voltage impressed on the battery for causing the generator to be disconnected from the battery independently of said controller.

4. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator field winding to the battery, additional switching means for connecting the generator armature winding to the battery in parallel-circuit relation to the field winding to crank the engine, said switching means being operated in sequential relation, a controller for initiating the operation of said switching means, and interlocking means on the first-named switching means for controlling the sequential operation of the last-named switching means.

5. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator field winding to the battery, additional switching means for connecting the generator armature winding to the battery in parallel-circuit relation to the field winding to crank the engine, a controller for initiating the operation of said switching means, interlocking means on the first-named switching means for controlling the sequential operation of the last-named switching means, and additional switching means for connecting the generator armature winding to the motor for power operation.

6. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator field winding to the battery, additional switching means for connecting the generator armature winding to the battery in parallel-circuit relation to the field winding to crank the engine, a controller for initiating the operation of said switching means, interlocking means on the first-named switching means for controlling the sequential operation of the last-named switching means, and additional switching means for connecting the generator armature winding to the motor for power operation, the operation of said last-named switching means being controlled by said controller.

7. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator field winding to the battery, additional switching means for connecting the generator armature winding to the battery in parallel-circuit relation to the field winding to crank the engine, a controller for initiating the operation of said switching means, interlocking means on the first-named switching means for controlling the sequential operation of the last-named switching means, and additional switching means for controlling the generator speed while cranking the engine.

8. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator field winding to the battery, additional switching means for connecting the generator armature winding to the battery in parallel-circuit relation to the field winding to crank the engine, a controller for initiating the operation of said switching means, interlocking means on the first-named switching means for controlling the sequential operation of the last-named switching means, and additional switching means for controlling the generator speed while cranking the engine, the operation of said last-named switching means being controlled by said controller.

9. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator field winding to the battery, additional switching means for connecting the generator armature winding to the battery in parallel-circuit relation to the field winding to crank the engine, a controller for initiating the operation of said switching means, and relay means responsive to the voltage impressed on the battery for also controlling the operation of said switching means.

10. In a locomotive control system, in combination, a traction motor, a generator for supplying current to the motor, said generator having an armature winding and a field winding, an engine for driving the generator, an exciter for energizing the generator field winding during power operation, a storage battery, switching means for connecting the generator field winding to the battery, additional switching means for connecting the generator armature winding to the battery in parallel-circuit relation to the field winding to crank the engine, a controller for initiating the operation of said switching means, and relay means responsive to the voltage impressed on the battery for controlling the operation of said switching means independently of said controller.

THELBERT L. WEYBREW.